US008525725B2

United States Patent
Libby et al.

(10) Patent No.: US 8,525,725 B2
(45) Date of Patent: Sep. 3, 2013

(54) METHOD AND SYSTEM FOR POSITION AND TRACK DETERMINATION

(75) Inventors: Vibeke Libby, Woodside, CA (US); Troy E. Wenski, San Jose, CA (US); Allen R. Lorenz, Stateline, NV (US)

(73) Assignee: Lockheed Martin Corporation, Bethesda, MD (US)

( * ) Notice: Subject to any disclaimer, the term of this patent is extended or adjusted under 35 U.S.C. 154(b) by 247 days.

(21) Appl. No.: 13/043,436

(22) Filed: Mar. 8, 2011

(65) Prior Publication Data

US 2011/0221634 A1   Sep. 15, 2011

Related U.S. Application Data (60) Provisional application No. 61/311,990, filed on Mar. 9, 2010.

(51) Int. Cl.
*G01S 13/06* (2006.01)
*G01S 13/00* (2006.01)

(52) U.S. Cl.
USPC ............... 342/59; 342/27; 342/118; 342/126; 342/146; 342/147; 342/175; 342/195; 342/450; 342/463; 342/465

(58) Field of Classification Search
USPC ............... 342/27, 28, 59, 118, 126, 146, 147, 342/175, 195, 450–465, 350; 455/403, 422.1, 455/456.1–457
See application file for complete search history.

(56) References Cited

U.S. PATENT DOCUMENTS

| | | | | |
|---|---|---|---|---|
| 3,184,739 A | * | 5/1965 | Franklin et al. | 342/59 |
| 3,308,380 A | * | 3/1967 | Graves et al. | 342/126 |
| 3,487,462 A | * | 12/1969 | Holberg | 342/59 |
| 3,531,801 A | * | 9/1970 | Huebscher | 342/126 |
| 3,706,096 A | * | 12/1972 | Hammack | 342/461 |
| 3,795,911 A | * | 3/1974 | Hammack | 342/463 |
| 3,953,856 A | * | 4/1976 | Hammack | 342/458 |
| 3,996,590 A | * | 12/1976 | Hammack | 342/465 |
| 4,728,959 A | * | 3/1988 | Maloney et al. | 342/457 |
| 4,841,304 A | * | 6/1989 | Richard et al. | 342/460 |
| 5,208,756 A | * | 5/1993 | Song | 342/457 |
| 5,534,868 A | * | 7/1996 | Gjessing et al. | 342/460 |
| 5,552,772 A | * | 9/1996 | Janky et al. | 342/463 |
| 5,570,096 A | * | 10/1996 | Knight et al. | 342/461 |
| 5,790,076 A | * | 8/1998 | Sypniewski | 342/457 |
| 5,883,598 A | * | 3/1999 | Parl et al. | 342/457 |
| 5,917,449 A | * | 6/1999 | Sanderford et al. | 342/457 |

(Continued)

OTHER PUBLICATIONS

Wilson, et al., "Through-Wall Motion Tracking Using Variance-Based Radio Tomography Networks," arXiv:0909.5417v2, Sep. 29, 2009, pp. 1-8.

*Primary Examiner* — Bernarr Gregory
(74) *Attorney, Agent, or Firm* — McDermott Will & Emery LLP (57) ABSTRACT

The present disclosure describes a method and system for detecting and determining the position of a target or intruder using a plurality of sensors positioned throughout a secured perimeter and a single antenna. The system of the present disclosure detects and determines the position of a target by first analyzing the return signal strength values of each of the sensors. Next, $Z_{values}$ for each of the sensors are calculated. Based on the $Z_{values}$, certain sensors are selected to compute a signal strength center-of-mass location, which is then used to determine the position of the target.

29 Claims, 11 Drawing Sheets

(56) References Cited

U.S. PATENT DOCUMENTS

| | | | |
|---|---|---|---|
| 6,084,547 A * | 7/2000 | Sanderford et al. | 342/457 |
| 6,822,604 B2 * | 11/2004 | Schantz et al. | 342/28 |
| 6,882,315 B2 * | 4/2005 | Richley et al. | 342/465 |
| 7,579,990 B2 * | 8/2009 | Yanagihara et al. | 342/463 |
| 7,627,329 B2 * | 12/2009 | Mizugaki et al. | 455/456.1 |
| 2008/0042898 A1 | 2/2008 | Sharma | |
| 2009/0067392 A1 | 3/2009 | Hart et al. | |
| 2010/0026490 A1 | 2/2010 | Butler et al. | |

\* cited by examiner

METHOD AND SYSTEM FOR POSITION AND TRACK DETERMINATION

RELATED APPLICATION

The present application for patent claims priority to Provisional Application No. 61/311,990 entitled "Method for Position and Track Determination in A Sensor Rich Environment Using A Single Antenna" filed Mar. 9, 2010, which is hereby expressly incorporated by reference herein.

STATEMENT REGARDING FEDERALLY SPONSORED RESEARCH OR DEVELOPMENT

Not Applicable.

FIELD OF THE INVENTION

The present invention generally relates to locating the position of a target. Particularly, some embodiments relate to locating the position of a target using a single antenna.

BACKGROUND

Securing a large area or perimeter can be very costly. A typical solution is to install a fence or a camera system along the perimeter of the secured area. However, these systems (e.g., camera system) typically require power, have a small field-of-view, and are generally vulnerable to breaking down or sabotage. Alternatively, an aerial reconnaissance of the secured area can be provided—using drones, airplanes or satellites. The problem with such solutions are high cost.

A less costly solution than aerial reconnaissance is fencing. However, installing a fence around a large perimeter is cumbersome and costly. Additionally, this solution lacks the ability to detect and pinpoint the location of an intruder, unless it is augmented with an additional sensing system to perform such abilities. Further, traffic patterns and people near the fence will most often go unnoticed since the fence is not touched.

SUMMARY OF THE INVENTION

Traditional security systems such as fence, camera, aerial reconnaissance lack the ability to detect and locate the position of an intruder in an accurate and cost effective way, unless it is augmented by fiber optic cables or other motion sensors that alarm when the sensor is touched. Accordingly, what is needed is a system capable of detecting an intruder outside or inside of the secured perimeter and accurately determining the position of such intruder. The present disclosure describes a method and system for detecting and determining the position of a target or intruder using a plurality of sensors positioned throughout a secured perimeter and a single antenna. The system of the present disclosure detects and determines the position of a target by first analyzing the return signal strength values of each of the sensors. Next, $Z_{values}$ for each of the sensors are calculated. A $Z_{value}$ is defined by the current return signal strength indicator (RSS or RSSI value) of a sensor minus the average baseline RSSI $Z_{value}$ of the sensor divided by standard deviation of the RSSI background value of the same sensor. Based on the $Z_{values}$, certain sensors are selected to compute a signal strength center-of-mass location, which is then used to determine the position of the target.

The present disclosure provides a method for determining a target location. The method involves: transmitting a plurality of radio signals from a single antenna; receiving a plurality of return signals from a plurality of sensors; determining a return signal strength value (RSSI) for each of the received plurality of return signals; selecting one or more sensors from the plurality of sensors having certain RSSI values; computing a signal strength center-of-mass location of the selected one or more sensors; and determining a location of the target based on the projection of the computed signal strength center-of-mass location onto the target vector.

According to another aspect of the present disclosure, a system for determining a target location is described. The system comprises a plurality of electromagnetic sensors, an antenna, and a processor. The antenna is configured to transmit a plurality of electromagnetic signals and to receive a plurality of return signals from a plurality of sensors. The processor is configured to: determine a return signal strength indicator (RSSI) value for each of the received plurality of return signals; select one or more sensors from the plurality of sensors having certain RSSI values; compute a signal strength center-of-mass location of the selected one or more sensors; and determine a location of the target based on the projection of the computed signal strength center-of-mass location on the target vector.

According to yet another aspect of the present disclosure, a computer executable program code on a non-transitory computer readable medium is described. The program code is configured to cause the computer to: determine a return signal strength indicator (RSSI) value for each of a plurality of return signals received at an antenna from a plurality of sensors; select one or more sensors from the plurality of sensors having certain RSSI values; compute a signal strength center-of-mass location of the selected one or more sensors; and determine a location of the target based on the projection of the computed signal strength center-of-mass location onto the target vector.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Reliable sensor systems with volumetric coverage of large areas are in high demand for general infrastructure protection. The method or system of present disclosure addresses the problem of locating and tracking an intruder in an area-covered sensor environment using only a single antenna. Because the system of the present disclosure (hereinafter referred to as "the present system") only uses a single antenna, conventional means of locating the position of a target using triangulation is not possible—triangulation requires two or more antenna. In the present system, the sensor field is sampled approximately every second or less. This is equivalent to tracking an intruder in one second intervals. As will be discussed in detail, the present system uses an algorithm that is based on determining the location of an object in a time-step process.

Figure 1:
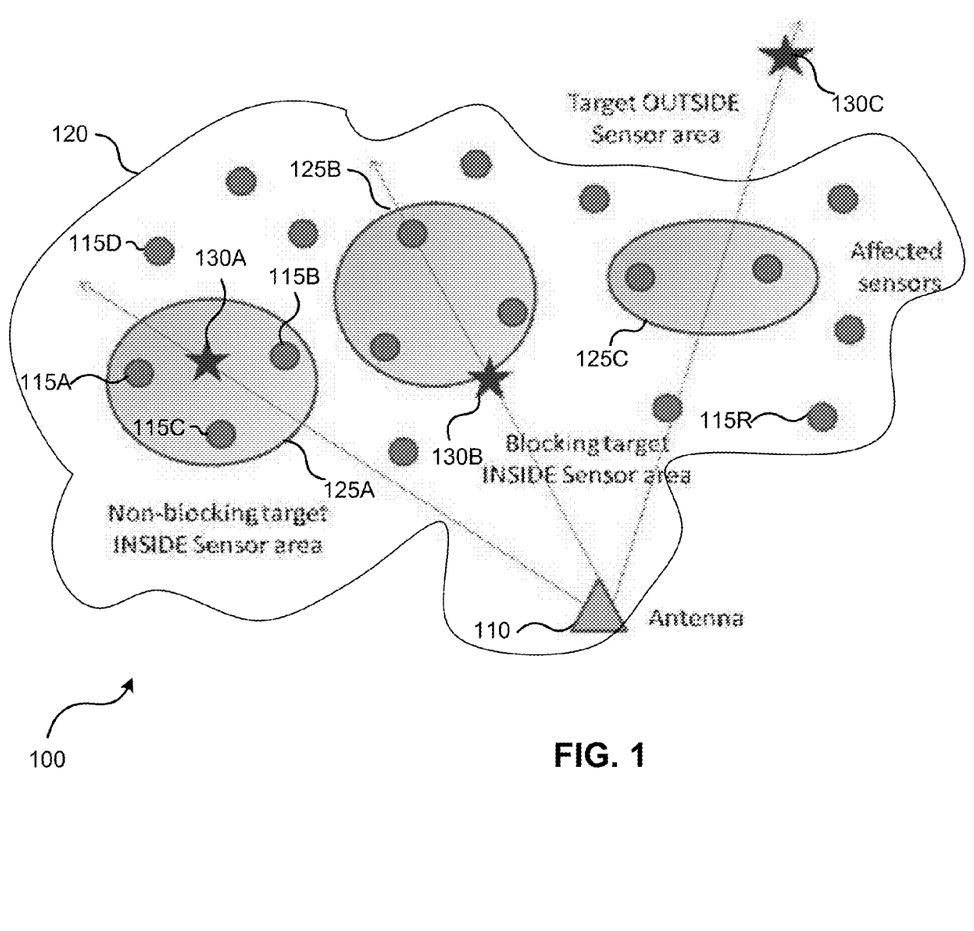
FIG. 1 illustrates an example environment in which a target detecting and locating system is implemented according to one aspect of the present disclosure.

FIG. 1 illustrates an exemplary area-covered sensor environment 100 in which a system or method for detecting and locating the position of a target is implemented according to one aspect of the present disclosure. Area-covered sensor environment 100 includes an antenna 110, a plurality of sensors 115A-115R, and targets 130A-130C. Antenna 110 is configured to transmit a plurality of electromagnetic signals in the direction of a sensor field 120, which comprises sensors 115A-115R. Within sensor field 120 are various sensor zones such as sensor zones 125A-125C. As shown in FIG. 1, sensor zone 120A comprises sensors 115A-115C. During operation, signals transmitted by antenna 110 is reflected back to antenna 110 by sensors 115A-115R. Based on a variety of factors such as time of day and environmental conditions, for example, antenna 100 detects a return signal with a certain signal strength from each of the sensors in sensor field 120 every second. It should be noted that other time interval could also be used.

FIG. 1 shows the three targets 130A-130C at different locations. Each target is detected by a different sensor zone. For example, target 130A is affecting the reading of sensors 115A-115C that define sensor zone 125A. Similarly, target 130C is affecting sensors within sensor zone 125C. It should be noted that the depiction of affected sensor zones is only for illustrative purposes. Actual affected sensors and sensor zones depend on the range of the target, the environment characteristics (e.g., elevation, weather, amount of foliages, etc.), and the type and composition of the target. For example, a human will impose more signal reduction (full or partial blocking) characteristic than an empty cardboard box or a highly reflective item, like a bicycle.

In the exemplary environment 100, three targets 130A-130C are shown. Target 130A is considered to be a non-blocking target as it is not blocking or partially blocking the return signals from sensors 115A-115C to antenna 110. It should be noted when a target is reducing the RSSI value of a sensor, it is considered to be fully blocking or partially blocking the return signals of a sensor. A partial blocking occurs when the return signal of a sensor is sufficiently affected such that the RSSI value of the sensor is decreased and statistically different from the baseline RSSI value of the sensor. The statistical difference may be a predetermined difference threshold or a predetermined standard deviation of the baseline RSSI. In any case, although target 130A may be blocking the return signals of a sensor 115D, the blocking may be insufficient to be considered an affected sensor. Target 130B is considered to be a blocking target as it blocks the return signals of one or more sensors located within sensor zone 130B. Finally, target 130C is considered an outside target since it does not block any of the sensors within sensor field 120.

On a high level, an object in proximity to a sensor causes fluctuations in a power level in the communication signal returned by the sensor (often referred to as returned signal strength indicator (RSSI)). The change in the RSSI is used to identify the presence of an object that has been introduced to the environment. Once a presence has been determined, the position of the object may be determined. In one aspect of the present disclosure, the position can be determined in a two step process. First, a radial-component is determined by way of a full or partial blocking. Second, a distance from the antenna to the object is determined by determining the center-of-mass (CM) between the sensors with positive returns or increase in RSSI values in the neighborhood of the radial component and projecting the CM onto the radial component. The coordinates of the point of intersection are then determined. This point now becomes an approximate location of the object.

Figure 2:
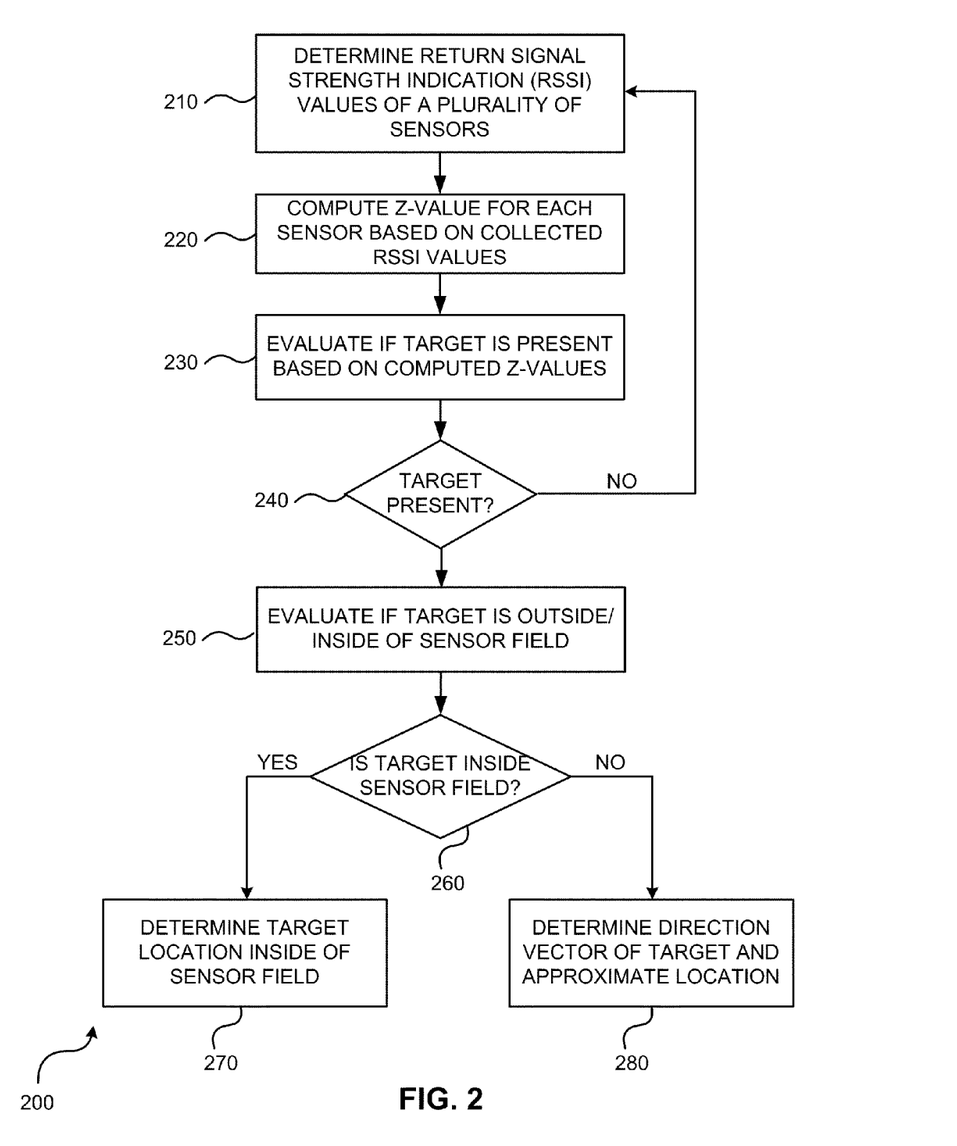
FIG. 2 illustrates a flow chart for detecting and locating a target according to one aspect of the present disclosure.

FIG. 2 illustrates a flow diagram of a method 200 for detecting and locating the position of a target according to one aspect of the present disclosure. Method 200 starts at step 210 where the return signal strength indication (RSSI) of each sensor in a sensor field (e.g. sensor field 120) is determined. Depending on the size of the area being monitored, a sensor field may have a few to hundreds or thousands of sensors. As illustrated in FIG. 1, sensor field 120 comprises eighteen sensors, 115A to 115R.

At step 220, a $Z_{value}$ for each of the sensors in the sensor field is computed based on its RSSI value collected in step 210. A $Z_{value}$ is defined as $$\frac{RSSI_{Avg\_baseline} - RSSI_{measured}}{\sigma_{baseline}}.$$

The $RSSI_{Avg\_baseline}$ is an average baseline RSSI value for the sensor over a given time period or number of samples. Baseline sampling can occur, for example, when the environment undergoes changes, such as, temperature variations, humidity changes, or when electronic or other RF background "noise" is introduced that affect the entire area-covered sensor field. Whereas in an intruder scenario, only certain sensors in the sensor field is affected rather than the entire sensor field. In one embodiment, the $RSSI_{Avg\_baseline}$ is computed over the last five samples or five seconds. Alternatively, the $RSSI_{Avg\_baseline}$ may be computed using at least 3 samples or 3 seconds. It should be noted that in a noisy environment, a longer period of sampling time should be used (more samples). Additionally, the sampling period may be dynamically changed during the day based on the temperature, humidity conditions, weather patterns, etc. In this way nuisance alarms may be minimized and system sensitivity preserved.

In one aspect of the present disclosure, the $RSSI_{Avg\_baseline}$ is calculated for each sensor, individually. If a sensor is not responding (i.e. gives a RSSI-value of zero) at sample n, then sample n can be ignored in the computation of the mean by reducing the sample size. For example, the mean for seven RSSI-values for a single sensor of (3, 0, 5, 4, 0, 4, 4) and can be computed as: (3+5+4+4+4)/5=4. Another sensor during the same collection may have RSSI values of (6, 8, 7, 7, 6, 8, 7), and thus have a mean of 7. It should be noted that not all sensors will have the same sample size for computing the baseline.

Further, the $RSSI_{measured}$ is the current measured RSSI value of the sensor. The $\sigma_{baseline}$ is the standard deviation of the baseline RSSI values measured over a time period prior to collecting the $RSSI_{measured}$.

Once the $Z_{value}$ is computed for each sensor in the sensor field, method 200 evaluates whether a target is present within or outside of the area-covered sensor zone based on the computed $Z_{values}$ at step 230.

At decision step 240, if no target is determined to be present, method 200 loops back to step 210 to collect and analyze the RSSI value of each sensor and proceeds forward to the next time-step accordingly. If a target is present at step 240, method 200 evaluates whether the target is outside or inside of the sensor field based on one or more $Z_{values}$ of one or more sensors. If the target is determined to be inside of the sensor field at step 260, method 200 then determines the location or position of the target inside of the sensor field relative to an origin. The origin may be the location of the antenna or any arbitrary location. If the target is determined to be outside of the sensor field at step 260, a direction vector showing the direction of the target relative to the origin is determined at step 280. Additionally, the approximate location of the target along the direction vector is also determined.

Figure 3:
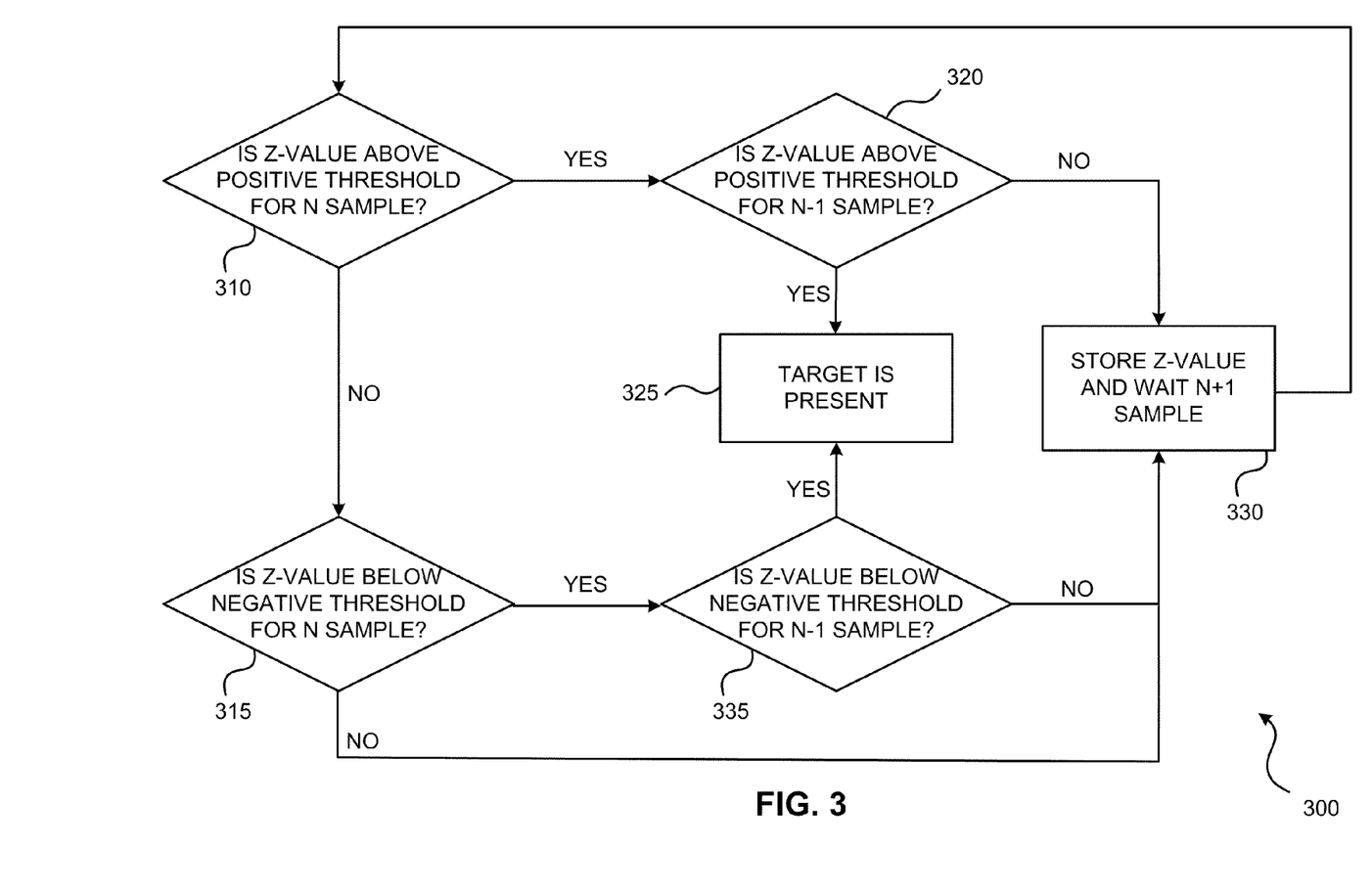
FIG. 3 illustrates a flow chart for detecting a target using one sensor according to one aspect of the present disclosure.

FIG. 3 illustrates a flow diagram of method 300 for determining whether a target is present using a single sensor according to one aspect of the present disclosure. Method 300 starts at step 310 where it is determined whether the $Z_{value}$ is above a positive threshold at sample n. The positive threshold may be established based on previous $Z_{values}$. In one embodiment, the positive threshold may be any value above 1. In one aspect, a sensor will not normally show a positive $Z_{values}$ larger than +5 unless it is being blocked, or partially blocked, by an item or person. Targets approaching the sensor field can normally cause sensors to create an enhanced response due to reflection of signals off the target. When a $Z_{value}$ exceeds a certain threshold-value (e.g., >5), target monitoring can be initiated.

It should be noted that a lower threshold will cause the detection system to be more sensitive and thus more prone to false detection. Contrarily, a high threshold will cause the detection system to be less sensitive and more robust to false positive. The threshold may also be adjusted dynamically, depending on environmental conditions, time of day, weather, etc. In general, the further the $Z_{value}$ is from the threshold, the more likely it is that a target is present. The individual sensor $Z_{value}$ is a measure of this likelihood. The larger the absolute value of "Z", the more likely it is that the sensor return has been perturbed by the presence of a disturbance. This disturbance can be a person, a car, a newly introduced object, or simply a change in the environment caused by a burst from a signal tower, or other transient events. If all the sensors are disturbed simultaneously, it is most likely caused by a global event like a low-flying plane or a malicious attempt to flood the system with an RF source.

Method 300 is designed to be able to distinguish real events from transient events by continuous monitoring of the environment and assessing the changes as they occur. It is not expected that the baseline will change significantly over the course of a few hours unless it experiences a significant change in weather conditions, for example.

In any case, if the answer is yes in step 310, method 300 then evaluates the previous sample, n−1, to determine whether it is also above a positive threshold at step 320. If the answer is yes at step 320, then a target is considered to be present at step 325. If the answer is no at step 320, then no target is considered to be present and the $Z_{value}$ is stored at step 330. The process then repeats at step 310.

Referring again to step 310, if the answer is no, method 300 determines whether the $Z_{value}$ of a current sample n is below a negative threshold at step 315. If no, then no target is considered to be present and the $Z_{value}$ is stored at step 330. The process then repeats at step 310. If the answer is yes at step 315, the method proceeds to step 335 where it is determined whether the $Z_{value}$ of sample n−1 is also below a negative threshold. If yes, then the target is considered to be present at step 325. Although method 300 uses two (n and n−1) samples as described above, the method may be adjusted to use any amount of samples in order to adjust the sensitivity of the detection. Additionally, rather than comparing the $Z_{value}$ with a negative or a positive threshold, an absolute of the $Z_{value}$ may be computed and compared with a single positive threshold. This, however, requires that both the negative and positive thresholds be equivalent in value.

Additionally, if the absolute $Z_{value}$ for a sensor is consistently less than 1, then the environment is quiet and close to baseline performance for that sensor. In establishing a threshold, it should be noted that a sensor will normally not show a positive $Z_{value}$ larger than 5 unless it is being blocked, or partially blocked, by a large item or person. Although the value 5 is described, depending on the scaling, other values could be implemented. In general, method 300 evaluates the validity of an event based on two consecutive $Z_{values}$ above threshold measurement. The more above threshold consecutive events, the higher the confidence that an intrusion is taking place. Method 300 could work for any number of consecutive samples.

Figure 4:
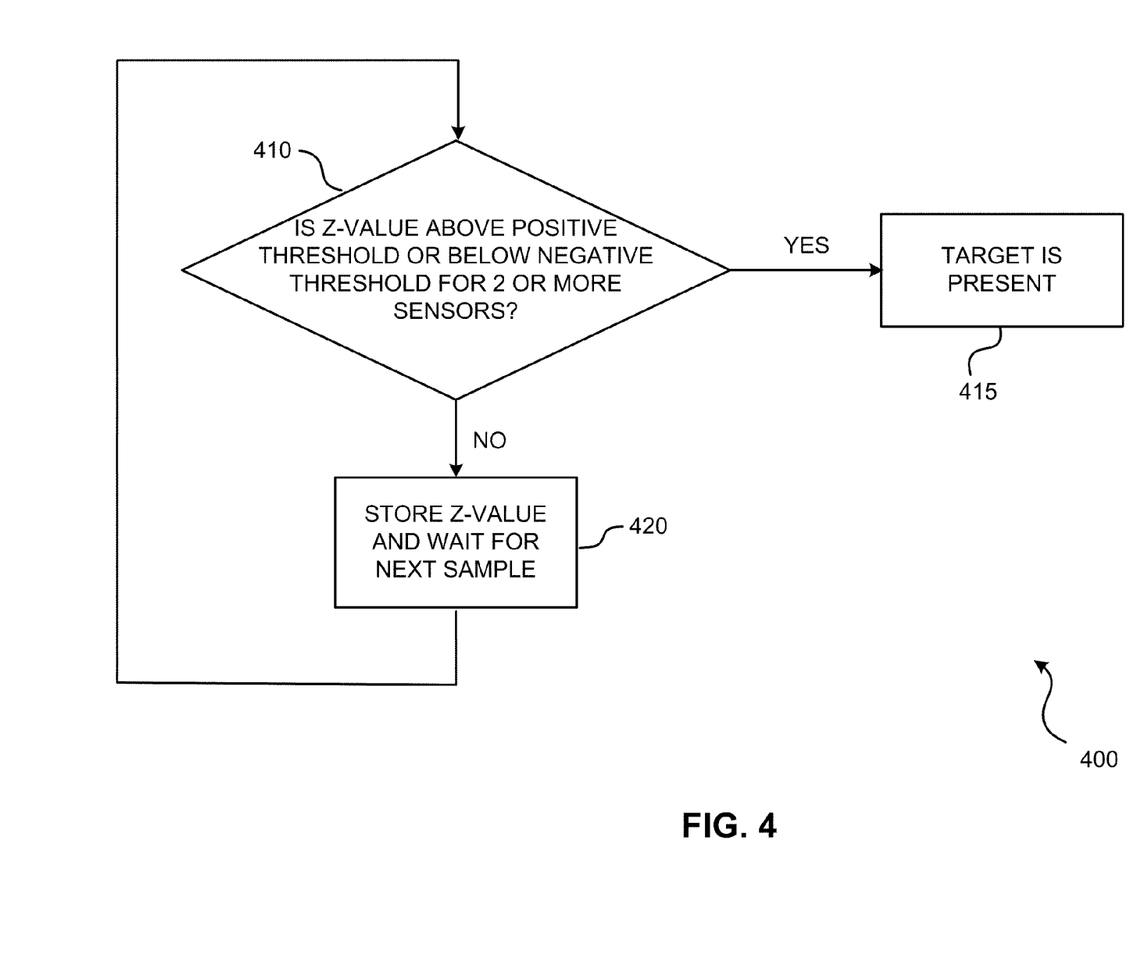
FIG. 4 illustrates a flow chart for detecting a target using multiple sensors according to one aspect of the present disclosure.

FIG. 4 illustrates a flow diagram of method 400 for determining whether a target is present using two or more sensors according to one aspect of the present disclosure. In method 400, if the $Z_{values}$ of one or more nearby sensors are both above a positive threshold or below a negative threshold, at step 410, then a target is considered to be present at step 415. If neither is true, one or more $Z_{values}$ are not above or below the respective threshold, then the $Z_{value}$ is stored at step 420. Additionally, method 400 waits for the next sample at step 420 and repeat the process starting at step 410. The process of method 400 may be repeated for each nearby or adjacent pair of sensors or any sensors within a predefined radius.

Figure 5:
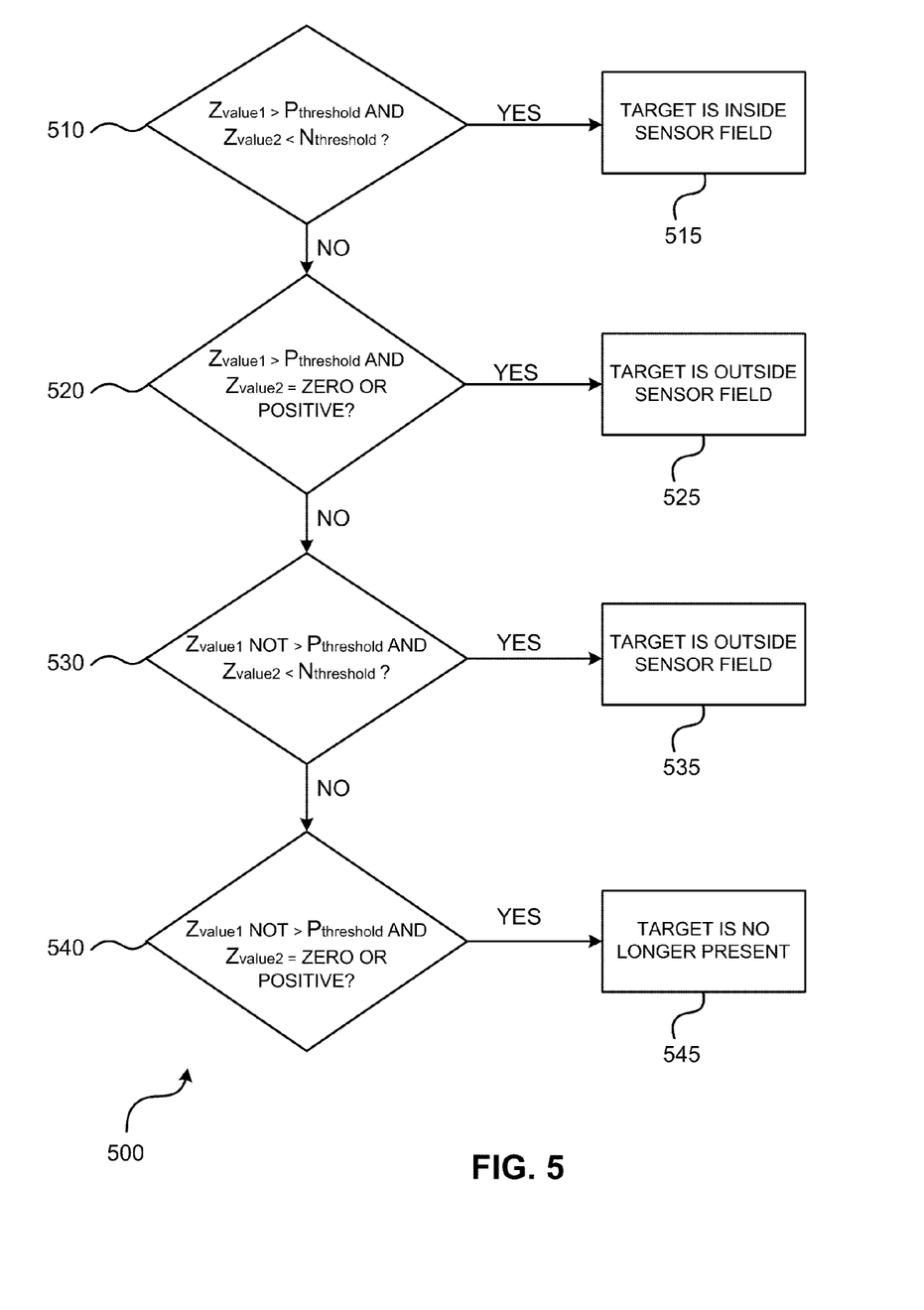
FIGS. 5-8 illustrate flow charts for determining a target location according to aspects of the present disclosure.

FIG. 5 illustrates a flow diagram of method 500 for determining whether a target is inside or outside the sensor field according to one aspect of the present disclosure. In method 500, a $Z_{value}$ of a first sensor ($Z_{value1}$) and a $Z_{value}$ of a second sensor ($Z_{value2}$) are compared with a positive threshold ($P_{threshold}$) and a negative threshold ($N_{threshold}$). If a certain condition exists, method 500 can determine whether the target is inside or outside of the sensor field. In step 510, if $Z_{value1}$ is greater than $P_{threshold}$ and $Z_{value2}$ is less than $N_{threshold}$, then the target is considered to be inside of the sensor field at step 515. In step 520, if $Z_{value1}$ is greater than $P_{threshold}$ and $Z_{value2}$ is zero or positive, then the target is considered to be outside of the sensor field at step 525. In step 530, if $Z_{value1}$ is not greater than $P_{threshold}$ and $Z_{value2}$ is less than $N_{threshold}$, then the target is considered to be outside of the sensor field at step 535. Finally, in step 540, if $Z_{value1}$ is not greater than $P_{threshold}$ and $Z_{value2}$ is zero or positive, then the target is considered to be no longer present. The process of method 500 may be repeated for each nearby or adjacent pair of sensors.

Targets approaching the area-covered sensor environment/field will normally cause sensors along the outside perimeter of the field to create an enhanced response (increased RSSI value) due to reflection of signals off the target. Thus, when a $Z_{value}$ is less than a certain threshold value (e.g., 2 times the standard deviation), target location and tracking monitoring should be initiated. In summary, if any blocking or partially blocking is detected, then the target is inside the area-covered sensor environment and the target monitoring process should be initiated. During the monitoring stage, the performance of the perimeter sensors for approaching intruders may be stored and logged.

Figure 6:
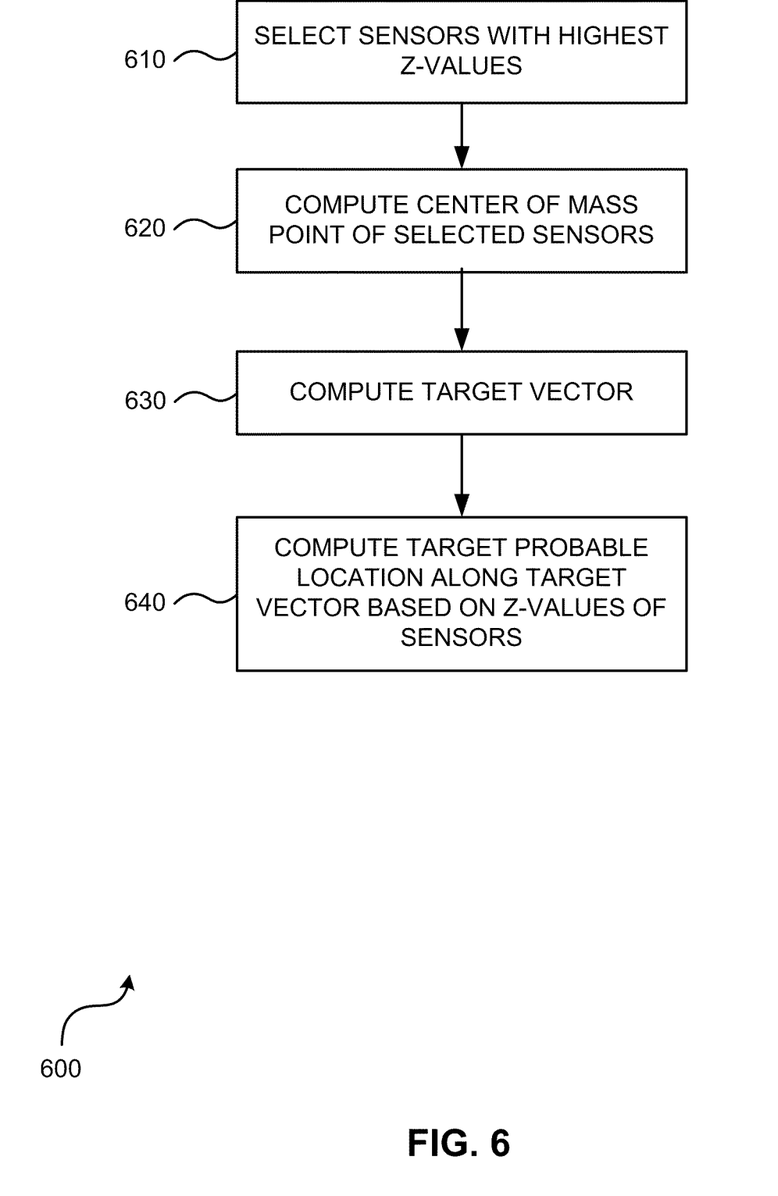

FIG. 6 illustrates a flow diagram of method 600 for determining the approximate location of a target outside of the sensor field according to one aspect of the present disclosure. Method 600 starts at step 610 where sensors with the highest $Z_{values}$ are selected. In one aspect of the present disclosure, the two sensors having the two highest $Z_{values}$ are selected. Additionally, it should be noted that more than two sensors may be selected at step 610.

At step 620, the signal strength center-of-mass location for the selected sensors are computed using the known coordinates of selected sensors. Next, the target vector or the direction vector of the target is computed at step 630. In one aspect of the present disclosure, the direction vector is drawn from the origin (typically the antenna) to the center of mass location of the selected sensors. In one aspect of the present disclosure the center of mass location of 2 sensors may be calculated based on the following equation:

$$CM = \frac{Z_1 r_1 + Z_2 r_2}{Z_1 + Z_2},$$

where $Z_1$ is the $Z_{value}$ of sensor 1, $r_1$ is the vector from the antenna to the sensor 1; and $Z_2$ is the $Z_{value}$ of sensor 2, $r_2$ is the vector from the antenna to the sensor 2. This direction vector shows the approximate direction of the target with respect to the origin. It also indicates that the location of the target is most likely along the line of the direction vector, but beyond the sensor field.

In step 640, the approximate location of the target is computed based on the $Z_{values}$ of the selected sensors. The larger $Z_{values}$, the closer the target is to the selected sensors along the direction vector. Conversely, the smaller the $Z_{values}$, the farther the target is from the selected sensors along the direction vector. The relative position of a target outside of the perimeter is calibrated during system initialization for relevant targets.

In situations where there are two or more potential targets, it may become necessary to determine whether each of those potential targets is real and distinct from each other. This ambiguity occurs when two targets are very close to each other or when a single target signal's signature is so large such that it affects multiple sensors. The system ability to resolve such ambiguity depends on the geometry of the sensor layout. However, to further improve the detection system and method, a minimum threshold of, for example, 30 degrees between direction vectors can be implemented. For each potential target, a direction vector is computed. Once the direction vectors are computed for all of the potential target using method 600, the angle between the direction vectors is calculated. The minimum threshold of 30 degrees means that if the angle between the two direction vectors of two potential targets is less than 30 degrees, than they are considered as one target rather than two distinct targets. It should be noted that another angle could also be used as the minimum angle threshold such as any angle between 10-40 degrees.

Additionally, in one aspect of the present disclosure, whenever the angle between two direction vectors is less than the minimum threshold angle, a camera may be configured to scan in the direction of the direction vectors to determine whether there are more than one target. The camera may use a wide field of view function if the separation was above 30 degrees and a narrower field of view combined with a zoom, if it is less. Camera-algorithms will then determine how many intruders actually are present in the field. The camera algorithms may employ heat signature or other methods to distinguish one or more targets.

Figure 7:
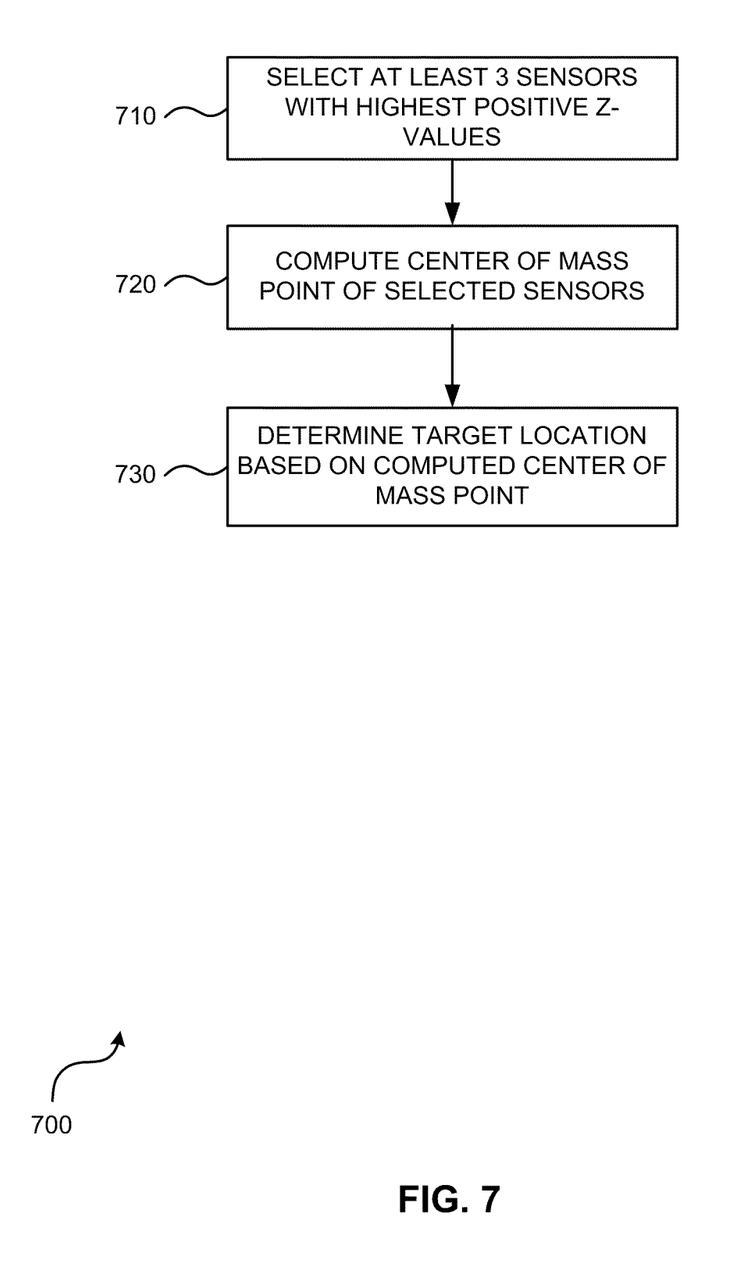

FIG. 7 illustrates a flow diagram of method 700 for determining the location of a target inside of the sensor field according to one aspect of the present disclosure. Method 700 starts at step 710 where at least three sensors with the highest positive $Z_{values}$ are selected. In one aspect of the present disclosure, each of the selected sensors must have $Z_{value}$ above the positive threshold. At step 720, the center of mass location for the at least three selected sensors is calculated. In one aspect of the present disclosure the center of mass location of 3 sensors may be calculated based on the following equation:

$$CM = \frac{Z_1 r_1 + Z_2 r_2 + Z_3 r_3}{Z_1 + Z_2 + Z_3},$$

where $Z_1$ is the $Z_{value}$ of sensor 1, $r_1$ is the vector from the antenna to the sensor 1; $Z_2$ is the $Z_{value}$ of sensor 2, $r_2$ is the vector from the antenna to the sensor 2; and $Z_3$ is the $Z_{value}$ of sensor 3, $r_3$ is the vector from the antenna to the sensor 3.

Next, the location of the target is computed based on the calculated center of mass location at step 730. It should be noted that method 700 applies only for target that is inside of the sensor field. One way to determine whether a target is certainly inside the sensor field is to analyze the last n RSSI values collected and determine whether there is any negative $Z_{value}$ within the last n RSSI values. N can be any user defined number.

Figure 8:
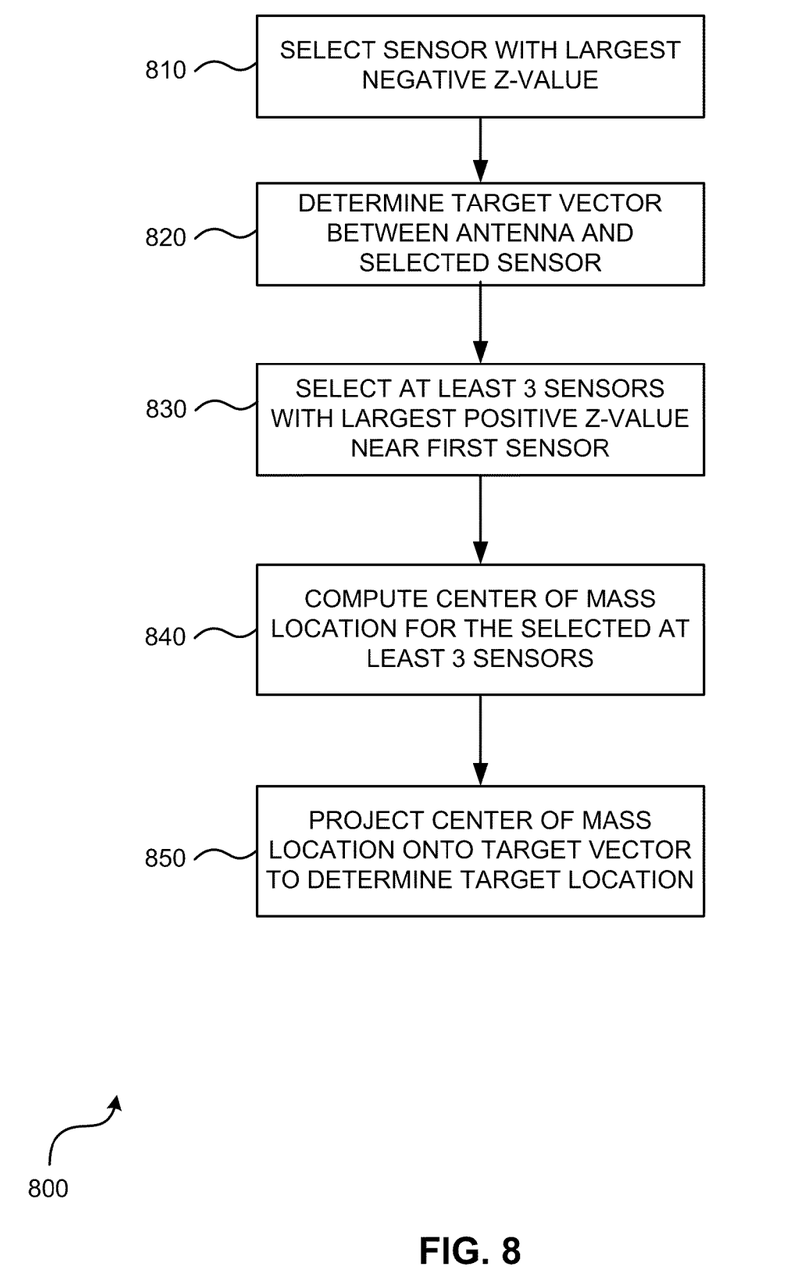

FIG. 8 illustrates a flow diagram of method 800 for determining the location of a target inside of the sensor field according to one aspect of the present disclosure. At step 810, a sensor with the largest negative $Z_{value}$ is selected. Next, the direction vector between the origin and the selected sensor is computed at step 820. In this case, it is simply the line between the origin and the location of the selected sensor. In step 830, at least three sensors with the largest positive $Z_{values}$ near the selected sensor with the largest negative $Z_{value}$ are selected. In one aspect of the present disclosure, each of the at least three sensors has $Z_{value}$ greater than the positive $Z_{value}$ threshold ($P_{threshold}$).

In step 840, the signal strength center of mass location for the selected at least three sensors is computed. Finally in step 850, to determine the location of the target, draw a line from the center of mass location such that the line is perpendicular to direction vector computed at step 820. The intersection of the newly drawn line and the direction vector indicates the location of the target. It should be noted that method 800 can be implemented when there are at least three sensors having positive $Z_{values}$ and at least one sensor having a large negative $Z_{value}$. Again, in one aspect of the present disclosure, each of the positive and negative $Z_{values}$ has to be greater than or less than a positive or negative $Z_{value}$ threshold, respectively.

Figure 9A:
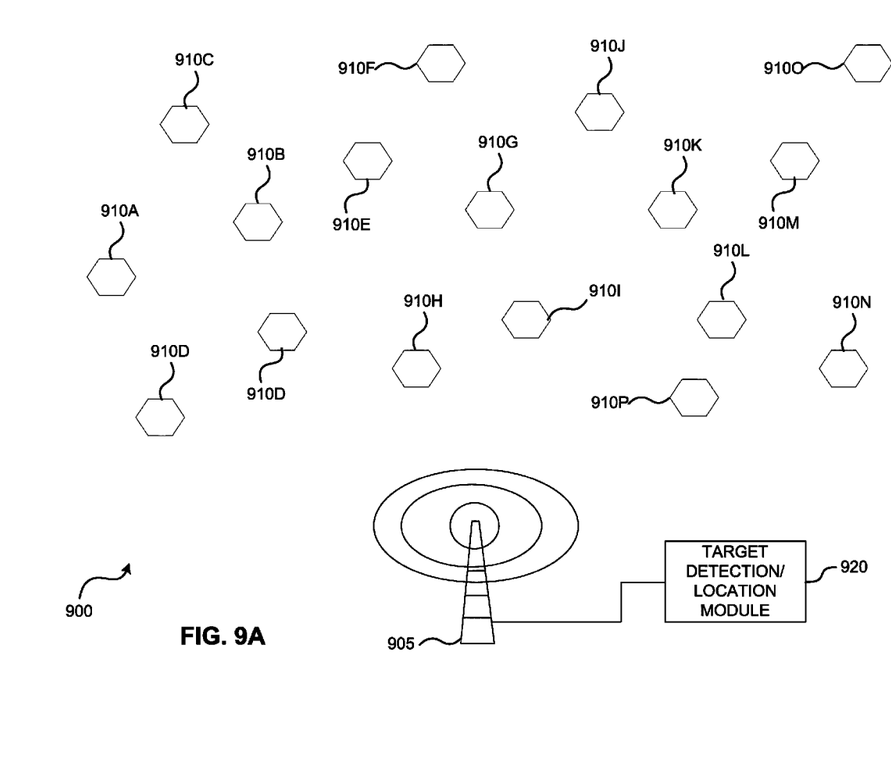
FIG. 9A illustrates a system for detecting and locating a target according to one aspect of the present disclosure.

FIG. 9A illustrates a system 900 with which the methods 200-800 are implemented according to one aspect of the present disclosure. As shown in FIG. 9, system 900 includes an transceiver (receiver/transmitter) 905, a plurality of sensors 910A to 910P, and a target detection/location module 920. Transceiver 905 is configured to regularly transmit a plurality of signals to sensors 910A-910P. Transceiver 905 is also configured to receive the RSSI value of each functioning sensor. Target detection-location module 920 is configured to perform all of the functions of methods 200-800. In other words, target detection/location module 920 is configured to compute the $Z_{value}$ of each sensor; determine whether a target is present; evaluate whether the target is outside or inside of the sensor field; determine the direction vector of the target; and determine the location or approximate location of the target.

Figure 9B:
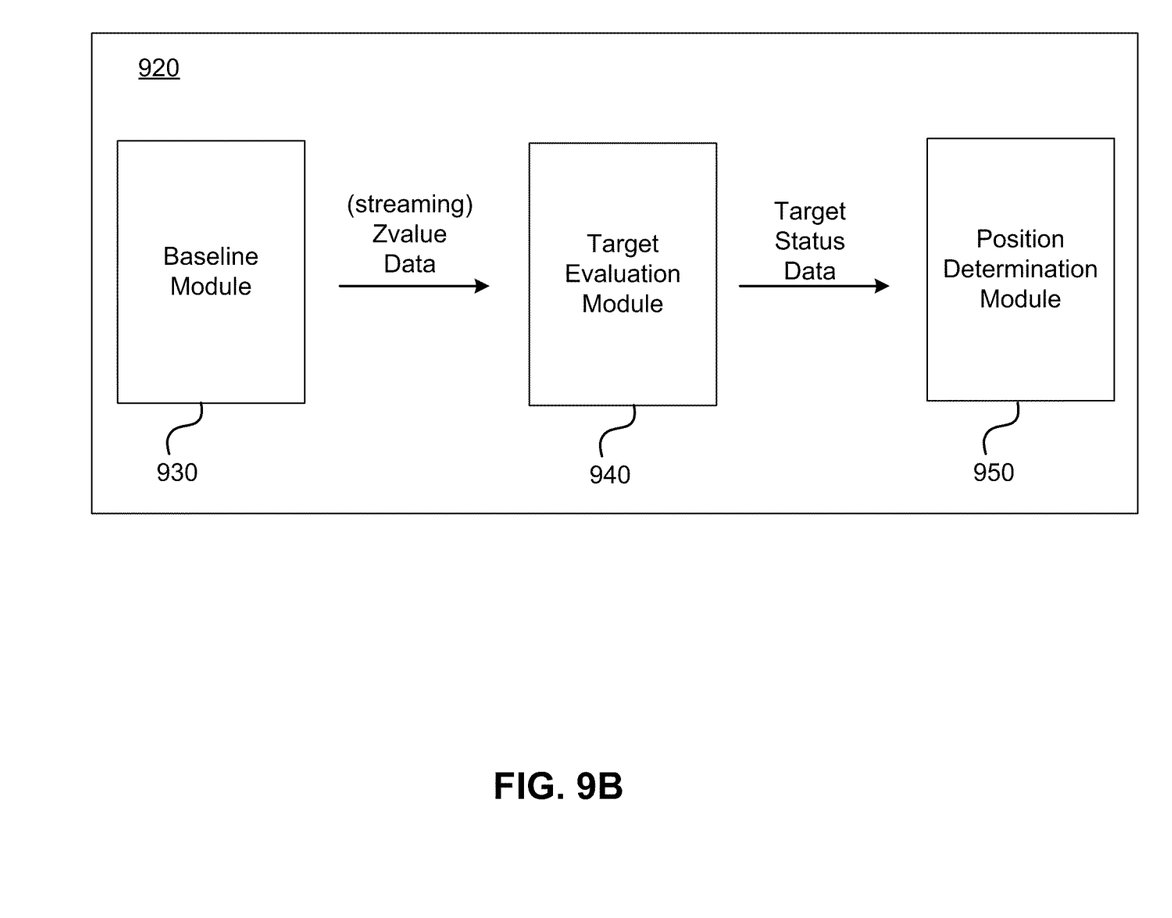
FIG. 9B illustrates a target detection/location module according to one aspect of the present disclosure.

FIG. 9B illustrates a target detection-location module 920 according to one aspect of the present disclosure. Referring now to FIG. 9B, a dataflow diagram illustrates various embodiments of module 920, which may include any number of sub-modules embedded therein. As can be appreciated, the sub-modules shown in FIG. 9B may be combined into a single module or partitioned into additional sub-modules to execute the various functions of module 920. Inputs to the system may be received from transceiver 905 and from a baseline module 930. Baseline module 930 is configured to compare RSSI values received from sensors in the field and to calculate the baseline information of each sensor to determine if an object is present. Baseline module 930 is also configured to compute the $Z_{value}$ for each sensor in the area-covered sensor environment and to forward the computed $Z_{value}$ to target evaluation module 940. In operation, module 930 stream the $Z_{values}$ to module 940 as they are being computed.

In various embodiments, to evaluate if a target is present, the values of the individual RSSI-values collected during a sensor collection run are evaluated. The further away from the expected baseline RSSI value the collected data is, the more likely a target is present. The individual sensor $Z_{value}$ can be a measure of this likelihood. As previously explained, the larger the absolute value of "z", the more likely it is that the sensor return has been changed by the presence of a disturbance.

A target evaluation module 940 can be configured to distinguish real events from transient events by continuously monitoring the environment and assessing the changes as they occur. It is not expected that the baseline will change significantly over the course of a few hours unless a large change in temperature is occurring. In one aspect of the present disclosure, module 940 is configured to evaluate sensors data using the following rules: if the absolute value of z for a sensor is consistently less than 1, then the environment is quiet and close to baseline performance for that sensor; if the absolute value exceeds a certain threshold (i.e., 6), then a target is deemed to be present and the target monitoring process can be initiated. Target monitoring means that target identification should not be initiated before the same sensor or another sensor within a predefined radius also exceeds the threshold value.

A position determination module 950 is configured to monitor the performance of the perimeter sensors for approaching intruders. In one aspect, the perimeter sensors shall have increased RSSI values as compared to the sensor respective baseline RSSI value as a target approaches. It should be noted that modules 930, 940, and 950 can be configured to perform one or more functions described in methods 200-800. Additionally, one or more of the modules can be combined to perform the functions of methods 200-800.

Figure 10:
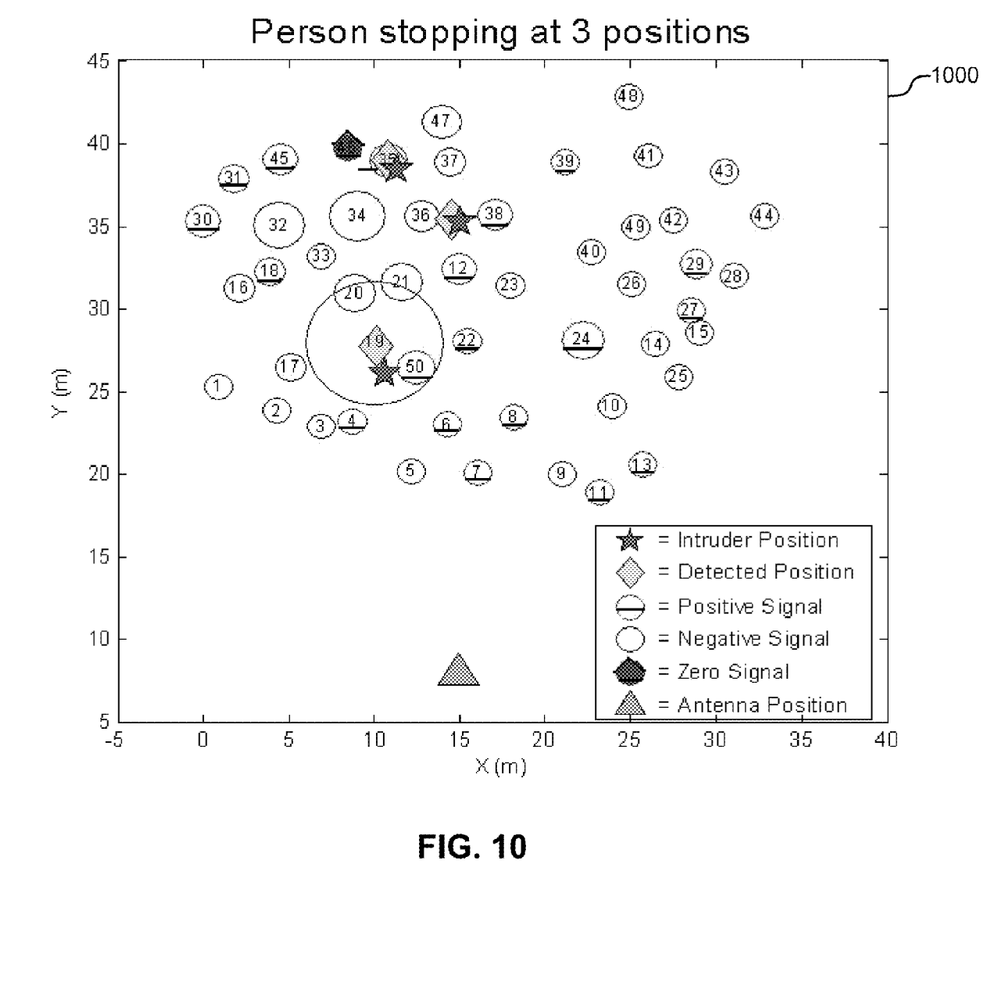
FIG. 10 illustrates exemplary data of the system for detecting and locating a target according to one aspect of the present disclosure.

FIG. 10 illustrates actual data collected from a real sensor field 1000 having a plurality of sensors randomly distributed therein. In sensor field 1000, sensors were distributed about 10 to 20 feet apart from each other. The three stars show the actual target positions. The three diamonds show predicted or detected positions of the three targets. As shown, the detected positions are very close to the actual location of the targets. Data collected from sensor field 1000 show that the detected positions are 2 to 15 inches away from the actual locations.

Additionally, MatLab simulations yielded results accurate enough to capture the intruder on camera and zoom for verification. Even when multiple intruders were present, the system responded as quickly as with only one intruder.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for determining a target location, the method comprising:
    transmitting a plurality of radio signals from a single antenna;
    receiving a plurality of return signal strength indicator (RSSI) values from a plurality of sensors;
    selecting one or more sensors from the plurality of sensors having certain RSSI values;

computing a signal strength center-of-mass location of the selected one or more sensors; and determining a direction vector of the target based on the computed signal strength center-of-mass location.

2. The method of claim 1, further comprising determining a location of the target based on the direction vector of the target.

3. The method of claim 2, further comprising determining whether the target is located inside or outside of a sensor field.

4. The method of claim 2, wherein the target vector is determined based on the computed signal strength center-of-mass location, wherein the selecting one or more sensor comprises selecting two sensors with highest computed $Z_{values}$, wherein the determining the location of the target comprises determining the location of the target along the computed target vector.

5. The method of claim 2, wherein the determining the location of the target comprises determining the location of the target along using signal strength center-of-mass location of three or more sensors with highest positive $Z_{value}$.

6. The method of claim 2, further comprising:
selecting a first sensor from the plurality of sensors with a largest negative z-value;
determining a target vector between the antenna and the first sensor, wherein the selecting one or more sensors comprises selecting at least three sensors with largest positive $Z_{value}$, wherein the computing signal strength center-of-mass location comprises computing signal strength center-of-mass location of the selected at least three sensors; and
projecting the computed signal strength center-of-mass location onto the determined target vector to determine the location of the target.

7. The method of claim 1, further comprising:
computing a $Z_{value}$ for each of the plurality of sensors; wherein the $Z_{value}$ comprises an average RSSI value of a respective sensor from the plurality of sensors minus a current RSSI value of the respective sensor divided by a standard deviation of RSSI values of the respective sensor, wherein the selecting one or more sensor comprises selecting one or more sensors based on the computed $Z_{value}$ of each sensor;
determining whether the target is present based on the computed $Z_{value}$.

8. The method of claim 7, wherein determining whether the target is present further comprises:
determining whether the target is present based on a plurality of $Z_{values}$ of a single sensor from the selected one or more sensors.

9. The method of claim 7, wherein determining whether the target is present further comprises:
determining whether the target is present based on $Z_{values}$ of first and second sensors from the selected one or more sensors.

10. The method of claim 9, further comprising determining whether the target is located inside or outside of a sensor field by comparing the calculated $Z_{values}$ of the first and second sensors with a positive $Z_{value}$ threshold and a negative positive $Z_{value}$ threshold.

11. A system for determining a target location, the system comprising:
a plurality of electromagnetic sensors;
an antenna configured to transmit a plurality of electromagnetic signals and to receive a plurality of return signals from a plurality of sensors; and
a processor configured to:
determine a return signal indicator (RSSI) value for each of the received plurality of return signals;
select one or more sensors from the plurality of sensors having certain RSSI values;
compute a signal strength center-of-mass location of the selected one or more sensors; and
determine a direction vector of the target based on the computed signal strength center-of-mass location.

12. The system of claim 11, wherein the processor is further configured to determine a location of the target based on the direction vector of the target.

13. The system of claim 12, wherein the processor is further configured to determine whether the target is located inside or outside of a sensor field.

14. The system of claim 12, wherein the processor is further configured to determine whether the target is present based on a plurality of $Z_{values}$ of a single sensor from the selected one or more sensors.

15. The system of claim 12, wherein the processor is further configured to determine whether the target is present based on $Z_{values}$ of first and second sensors from the selected one or more sensors.

16. The system of claim 15, wherein the processor is further configured to determine whether the target is located inside or outside of a sensor field by comparing the calculated $Z_{values}$ of the first and second sensors with a positive $Z_{value}$ threshold and a negative $Z_{value}$ threshold.

17. The system of claim 12, wherein the processor is further configured to determine a target vector based on the computed signal strength center-of-mass location, select two sensors with highest computed $Z_{values}$, and determine the location of the target along the computed target vector.

18. The system of claim 12, wherein the processor is further configured to determine the location of the target along using signal strength center-of-mass location of three or more sensors with highest positive $Z_{value}$.

19. The system of claim 12, wherein the processor is further configured to:
select a first sensor from the plurality of sensors with a largest negative z-value;
determine a target vector between the antenna and the first sensor, wherein the selected one or more sensors comprises at least three sensors with largest positive $Z_{value}$, wherein the signal strength center-of-mass location is computed using locations of the selected at least three sensors; and
project the computed signal strength center-of-mass location onto the determined target vector to determine the location of the target.

20. The system of claim 11, wherein the processor is further configured to:
compute a $Z_{value}$ for each of the plurality of sensors; wherein the $Z_{value}$ comprises an average RSSI value of a respective sensor from the plurality of sensors minus a current RSSI value of the respective sensor divided by a standard deviation of RSSI values of the respective sensor, wherein the one or more sensors are selected based on the computed $Z_{value}$ of each sensor; and
determine whether the target is present based on the computed $Z_{value}$.

21. A computer executable program code on a non-transitory computer readable medium configured to cause a computer to:
determine a return signal strength indicator (RSSI) value for each of a plurality of return signals received at an antenna from a plurality of sensors;

select one or more sensors from the plurality of sensors having certain RSSI values;

compute a signal strength center-of-mass location of the selected one or more sensors; and determine a location of the target based on the computed signal strength center-of-mass location.

22. The computer executable program code of claim 21, wherein the code is further configured to cause the computer to:

compute a $Z_{value}$ for each of the plurality of sensors; wherein the $Z_{value}$ comprises an average RSSI value of a respective sensor from the plurality of sensors minus a current RSSI value of the respective sensor divided by a standard deviation of RSSI values of the respective sensor, wherein the one or more sensors are selected based on the computed $z_{value}$ of each sensor;

determine whether the target is present based on the computed $Z_{value}$.

23. The computer executable program code of claim 21, wherein the code is further configured to cause the computer to determine whether the target is located inside or outside of a sensor field.

24. The computer executable program code of claim 21, wherein the code is further configured to cause the computer to determine whether the target is present based on a plurality of $Z_{values}$ of a single sensor from the selected one or more sensors.

25. The computer executable program code of claim 21, wherein the code is further configured to cause the computer to determine whether the target is present based on $Z_{values}$ of first and second sensors from the selected one or more sensors.

26. The computer executable program code of claim 25, wherein the code is further configured to cause the computer to determine whether the target is located inside or outside of a sensor field by comparing the calculated $Z_{values}$ of the first and second sensors with a positive $Z_{value}$ threshold and a negative positive $Z_{value}$ threshold.

27. The computer executable program code of claim 21, wherein the code is further configured to cause the computer to determine a target vector based on the computed signal strength center-of-mass location, select two sensors with highest computed $Z_{values}$, and determine the location of the target along the computed target vector.

28. The computer executable program code of claim 21, wherein the code is further configured to cause the computer to determine the location of the target along using the signal strength center-of-mass location of three or more sensors with highest positive $Z_{value}$.

29. The computer executable program code of claim 21, wherein the code is further configured to cause the computer to:

select a first sensor from the plurality of sensors with a largest negative z-value;

determine a target vector between the antenna and the first sensor, wherein the selected one or more sensors comprises at least three sensors with largest positive $Z_{value}$, wherein the signal strength center-of-mass location is computed using locations of the selected at least three sensors; and project the computed signal strength center-of-mass location onto the determined target vector to determine the location of the target.

* * * * *